(12) United States Patent
Perumal et al.

(10) Patent No.: US 7,804,803 B2
(45) Date of Patent: Sep. 28, 2010

(54) NEIGHBOR BASED TDMA SLOT ASSIGNMENT

(75) Inventors: Kannan Perumal, Madurai (IN); Manik Raina, Bangalore (IN); Subhas Kumar Ghosh, Bangalore (IN); Ranicer Patro, Bangalore (IN); Balamurugan Mohan, Madurai (IN)

(73) Assignee: Honeywell International Inc., Morristown, NJ (US)

( * ) Notice: Subject to any disclaimer, the term of this patent is extended or adjusted under 35 U.S.C. 154(b) by 1017 days.

(21) Appl. No.: 11/188,929

(22) Filed: Jul. 25, 2005

(65) Prior Publication Data

US 2007/0019594 A1    Jan. 25, 2007

(51) Int. Cl.
*H04Q 7/24* (2006.01)
(52) U.S. Cl. .................. 370/338; 370/345; 370/254; 370/252; 370/445; 370/229
(58) Field of Classification Search .......... 370/338, 370/337, 345, 252, 347, 503, 445, 254, 342; 340/870
See application file for complete search history.

(56) References Cited

U.S. PATENT DOCUMENTS

| | | | | |
|---|---|---|---|---|
| 6,901,064 B2 * | 5/2005 | Cain et al. | ................... | 370/337 |
| 7,002,910 B2 * | 2/2006 | Garcia-Luna-Aceves et al. | . | 370/229 |
| 2004/0032847 A1 * | 2/2004 | Cain | .......................... | 370/338 |
| 2004/0133640 A1 * | 7/2004 | Yeager et al. | ................ | 709/204 |
| 2005/0058151 A1 * | 3/2005 | Yeh | ............................ | 370/445 |
| 2005/0122231 A1 * | 6/2005 | Varaiya et al. | ......... | 340/870.01 |
| 2005/0190796 A1 * | 9/2005 | Date et al. | ................... | 370/503 |
| 2006/0109831 A1 * | 5/2006 | Tillotson | .................... | 370/342 |
| 2006/0198346 A1 * | 9/2006 | Liu et al. | ..................... | 370/338 |
| 2007/0280153 A1 * | 12/2007 | Sinha | ......................... | 370/328 |

OTHER PUBLICATIONS

S. C. Ghosh et al., "Channel Assignment Using Genetic Algorithm Based on Geometric Symmetry", IEEE Transactions on Vehicular Technology, pp. 1-16, Jul. 2003.
S. C. Ghosh et al., "A New Approach to Efficient Channel Assignment for Hexagonal Cellular Networks", Intl. Journal of Foundations of Computer Science © World Scientific Publishing Company, vol. 14, No. 3, pp. 1-25, Jun. 2003.
D. J. Corbett et al., "A Partitioned Power and Location Aware MAC Protocol for Large Ad Hoc Networks", Proc. Of European Wireless 2005, Cyprus, 7 pgs., Apr. 2005.
K. Sinha et al., "Broadcast Algorithms for Mobile Ad hoc Networks based on Depth-first Traversal", Proc. Third Intl. Workshop on Wireless Information Systems (WIS), Apr. 13-14, 2004, Portugal, pp. 170-177.

(Continued)

*Primary Examiner*—Charles N Appiah
*Assistant Examiner*—Michael T Vu
(74) *Attorney, Agent, or Firm*—Schiff Hardin LLP

(57) ABSTRACT

Non-overlapping time slots are allocated to a plurality of nodes in a network by a mobile agent that moves from node to node of the network. At a current node of the network, the mobile agent accesses neighbor information that includes time slot information relative to neighbor nodes of the current node. The neighbor nodes are neighbors of the current node. At the current node of the network, the mobile agent also assigns mutually exclusive time slots for the neighbor nodes.

10 Claims, 8 Drawing Sheets

OTHER PUBLICATIONS

K. Sinha et al., "Broadcast and Gossiping Algorithms for Mobile Ad hoc Networks based on Breadth-first Traversal", Proc. 6$^{th}$ Intl. Workshop on Distributed Computing (IWDC), 12 pgs., Dec. 2004.

Y.-C. Tseng et al., "Fully Power-Aware and Location-Aware Protocols for Wireless Multi-hop Ad Hoc Networks*", Proc. Of IEEE Intl. Conference on Computer Communications and Networks (ICCCN), 6 pgs., 2002.

S. Basagni et al., "A Mobility-Transparent Deterministic Broadcast Mechanism for Ad Hoc Networks", IEEE/ACM Transactions on Networking, vol. 7, No. 6, pp. 799-807, Dec. 1999.

M. Chrobak et al., "Fast Broadcasting and Gossiping in Radio Networks", Proc. 41$^{st}$ IEEE Symp. Found. Of Computer Science (FOCS' 2000), 7 pgs., 2000.

K. Perumal et al., "Neighbor Based TDMA slot assignment algorithm for WSN", Proc. Of IEEE Infocom, 3 pgs., 2005.

L.F.W. van Hoesel et al., Advantages of a TDMA based, energy-efficient, self-organizing MAC protocol for WSNs, IEEE Vehicular Technology Conference, Italy, pp. 1-5, 2004.

J. Grönkvist, "Comparison Between Scheduling Models for Spatial Reuse TDMA", Proc. Of the Affordable Wireless Services and Infrastructure, 5 pgs., Jun. 2004.

S. C. Ghosh et al., "Coalesced CAP: An Improved Technique for Frequency Assignment in Cellular Networks," IEEE Transactions on Vehicular Technology, vol. 55, No. 2, Mar. 2006, pp. 640-653.

J. Zangl et al., "Large ad hoc sensor networks with position estimation," Proc. of 10th Aachen Symposium on Signal Theory, Germany, 2001, 6 pgs.

D. Niculescu et al., "Ad hoc positioning system (APS)," Proc. of IEEE Global Communications Conference (GLOBECOM), 2001, 6 pgs.

W.-H. Liao et al., "GRID: a fully location-aware routing protocol for mobile ad hoc networks," Telecommunication Systems, Kluwer Academic Publishers, vol. 18, pp. 1-26, 2001.

S. Čapkun et al., "GPS-free positioning in mobile ad-hoc networks," Proc. of 34th Hawaii Intl. Conf. of System Sciences HICSS, pp. 1-15, Jan. 2001.

B. Chlebus et al., "Deterministic broadcasting in unknown radio networks", Proc. of SODA 2000, pp. 1-10, 2000.

K. Nakano et al., "Randomized initialization protocols for ad-hoc networks", IEEE Trans. on Parallel and Distributed Systems, vol. 11, pp. 749-759, 2000.

K. Nakano et al., "Uniform leader election protocols for radio networks," IEEE Trans. on Parallel and Distributed Systems, vol. 13, No. 5, pp. 516-526, May 2002.

Zhu et al., "A five-phase reservation protocol (FDRP) for mobile ad hoe networks," *Wireless Networks*, vol. 7, pp. 371-384, Jul. 2001.

S. S. Kulkarni et al. "TDMA services for sensor network," In *Proceedings of the Third International Workshop on Assurance in Distributed Systems and Networks(ADSN)*, Hachioji, Tokyo, Japan, Mar. 2004.

Ramaswami et al., "Distributed scheduling of broadcasts in a radio network," In *NFOCOM*, 1989, pp. 497-504.

Chlamtac et al., "A spatial reuse TDMA/FDMA for mobile multi-hop radio networks," In *Proceedings of IEEE INFOCOM*, 1985, vol. 1, pp. 389-394.

Sen et al., "A new model for scheduling packet radio networks," Wireless Networks 3 (1997), pp. 71-82.

Huson et al., "Broadcast scheduling algorithms for radio networks," In *IEEE MILCOM*, pp. 647-651, 1995.

Wei Ye et al., "An Energy-Efficient MAC protocol for Wireless Sensor Networks", USC/ISI Technical Report ISI-TR-543, Sep. 2001, pp. 1-10.

* cited by examiner

NEIGHBOR BASED TDMA SLOT ASSIGNMENT

TECHNICAL FIELD OF THE INVENTION

The present invention relates to the assignment of time division multiple access (TDMA) slots in a network.

BACKGROUND OF THE INVENTION

In recent years, networks such as wireless sensor networks have emerged as an ideal solution to a number of applications such as monitoring, target tracking, biological/chemical attack detection, and commercial and residential automation. Wireless sensor networks share many common traits with existing wireless ad-hoc network concepts, but there are also a few differences and specific challenges. One of the challenges is that energy is typically scarce in a wireless sensor network and it is difficult and sometimes impossible to replenish the source or sources of that energy. Therefore, protocols that save power need to be developed to conserve energy in wireless sensor networks. For example, there is considerable interest currently in designing and developing a highly energy efficient Medium Access Control (MAC) protocol for wireless sensor networks.

A MAC protocol typically encapsulates payload data with a header before the data and a Cyclic Redundancy Check (CRC) after the data. The entire frame is preceded by a small idle period and a preamble. The idle period is provided to allow a small time interval for the receiver electronics in the nodes of a network to settle after processing previous frames. The preamble is provided to allow the node receiver to synchronize its data clock to the transmit data clock. The header consists of a destination address, a source address, and a type field.

The major sources for the depletion of the energy source of a node are overhearing, idle listening, and packet collisions. In overhearing, a node wastes energy in receiving packets that are not addressed to it. Idle listening is the state in which a node does not know when it will be the receiver of a message from one of its neighbor nodes. So, the node must continuously maintain itself in the receive mode, which wastes energy. In case of packet collisions, the node has to retransmit a packet that is involved in collisions with one or more other packets, which again wastes energy.

Classes of contention-based MAC protocols, like carrier sense multiple access (CSMA) protocols, are not suitable for wireless sensor networks because they waste energy. A reservation based MAC protocol such as code division multiple access (CDMA) is not preferred in a sensor network because it requires special hardware and consumes substantial energy during encoding and decoding of information. Frequency division multiple access (FDMA) can be used in wireless sensor networks but it is costly compared to TDMA systems.

Many TDMA slot assignment algorithms have been proposed for wireless sensor networks. For example, a five phase reservation protocol (FPRP) has been previously proposed to employ a contention-based mechanism in which nodes compete with each other to acquire TDMA slots. With the help of a five-phase algorithm, a final reservation schedule for the whole network is generated.

Almost all TDMA algorithms that have been proposed for wireless sensor networks generate a communication schedule for the entire network. For some applications, it is not necessary to assign slots to all nodes in the network at the same time. For example, in a target-tracking application, only the nodes in the vicinity of a target should participate in data gathering, and these nodes require a communication channel to transmit the gathered data. However, all of the other nodes are idle and are not part of the data gathering and communication process. Therefore, it is not necessary to assign time slots to these other nodes, which results in a better utilization of the channel. Not assigning time slots to certain nodes requires a change in the usual TDMA approach. Accordingly, either a reactive TDMA algorithm or a modified proactive TDMA algorithm that assigns time slots to nodes on demand is suitable for target tracking kinds of applications.

The present invention is directed to a neighbor base assignment of time slots.

SUMMARY OF THE INVENTION

According to one aspect of the present invention, a method of allocating non-overlapping time slots to a plurality of nodes in a network comprises the following: executing a mobile agent at a current node of the network; accessing neighbor information by execution of the mobile agent, wherein the neighbor information includes time slot information relative to neighbor nodes of the network, and wherein the neighbor nodes are neighbors of the current node; and, assigning mutually exclusive time slots for the neighbor nodes by execution of the mobile agent.

According to another aspect of the present invention, a wireless network comprises a plurality of wireless sensor nodes and a mobile agent. Each node has a communication radius and a sensing radius, the communication radius defines a distance over which a corresponding node is capable of effectively communicating, the sensing radius defines a distance over which a corresponding node is capable of effectively sensing a condition, and the communication radius of each node is at least as great as the sensing radius of the corresponding node. The mobile agent moves to a current node in the network, accesses neighbor information including time slot information relative to one-hop neighbor nodes of the current node, and assigns mutually exclusive time slots to only the one-hop neighbor nodes.

According to still another one aspect of the present invention, a computer readable storage medium has a mobile agent stored thereon such that execution of the mobile agent at a current node of the network performs the following functions: querying each neighbor node of the current node for a time slot list of the neighbor node and for a flag indication of whether the mobile agent MA has previously visited the neighbor node; updating the time slot list of each neighbor node of the current node by assigning a mutually exclusive time slot to an ID of the current node; determining from the flag indications whether the mobile agent has visited all of the neighbor nodes of the current node; if the mobile agent has not visited all of the neighbor nodes of the current node, moving to an unvisited one of the neighbor nodes; and, if the mobile agent has visited all of the neighbor nodes of the current node, backtracking to a previously visited one of the neighbor nodes.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
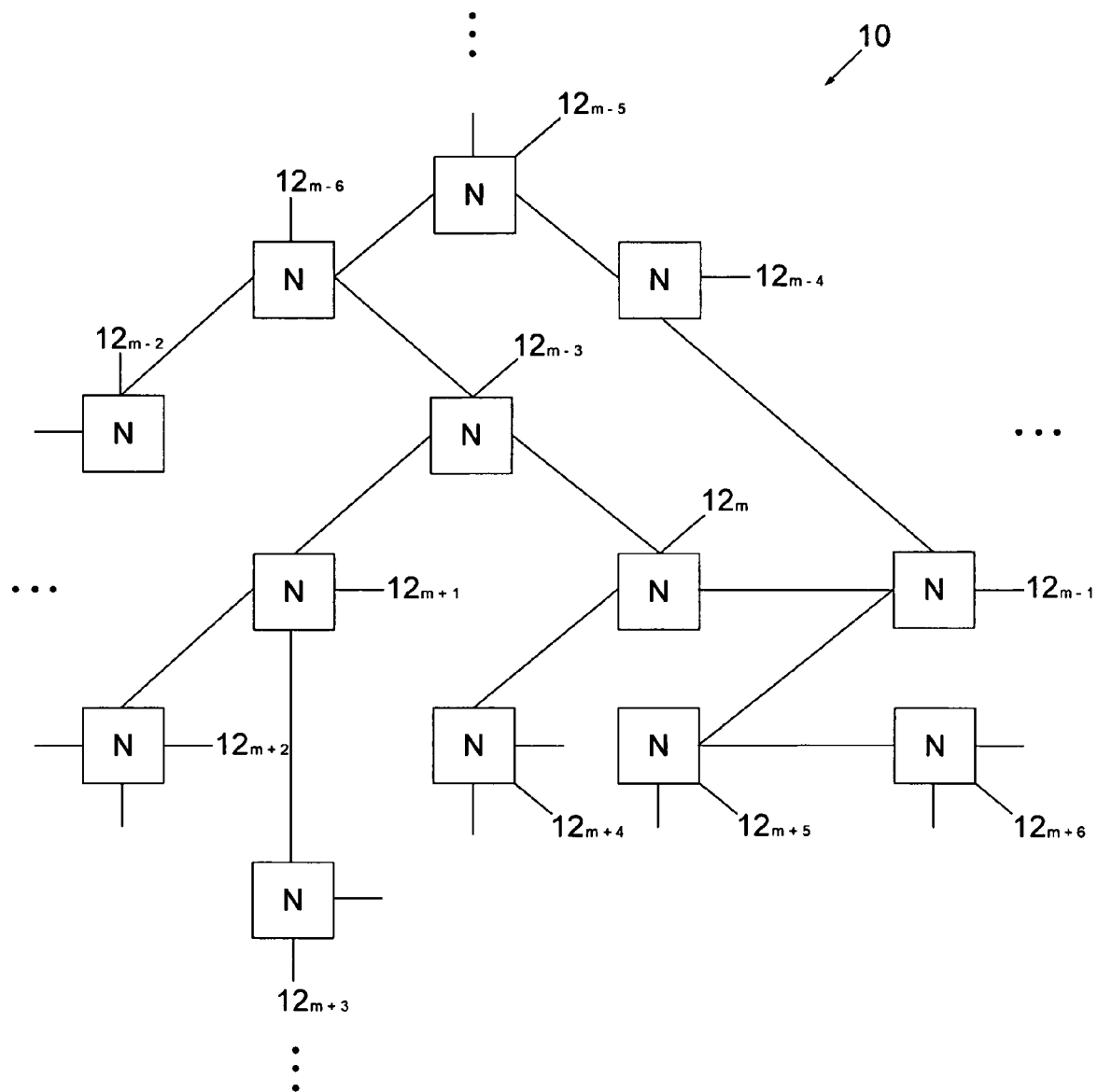
FIG. 1 illustrates a network comprising a plurality of nodes which are configured in accordance with an embodiment of the present invention.

FIG. 1 shows a network 10 comprising nodes $12_1, \ldots, 12_{m-6}, 12_{m-5}, 12_{m-4}, 12_{m-3}, 12_{m-2}, 12_{m-1}, 12_m, 12_{m-1}, 12_{m+2}, 12_{m+3}, 12_{m+3}, 12_{m+4}, 12_{m+6}, \ldots, 12_n$. The network 10, for example, may be a sensor network such as a wireless sensor network. Accordingly, the links between the nodes $12_1, \ldots, 12_{m-6}, 12_{m-5}, 12_{m-4}, 12_{m-3}, 12_{m-2}, 12_{m-}, 12_m, 12_{m+1}, 12_{m+2}, 12_{m+3}, 12_{m+4}, 12_{m+5}, 12_{m+6}, \ldots, 12_n$ may be wireless links such as infrared links, ultrasonic links, RF links, or any other type of wireless link. Alternatively, these links may be provided by electrical wires, optical fiber cables, or other physical connections between the nodes.

As shown in FIG. 1, each of the nodes may be in direct communication with one or more other nodes and may be in indirect communication with one or more of the remaining nodes. For example, the node $12_{m-3}$ is in direct communication with the nodes $12_{m-6}, 12_m$, and $12_{m+1}$, and is in indirect communication with other nodes such as the nodes $12_{m-2}$ and $12_{m-5}$ through node $12_{m-6}$. The nodes $12_{m-6}, 12_m$, and $12_{m+1}$ are considered to be one-hop neighbor nodes of the node $12_{m-3}$ because they are in direct communication with the node $12_{m-3}$.

Figure 2:
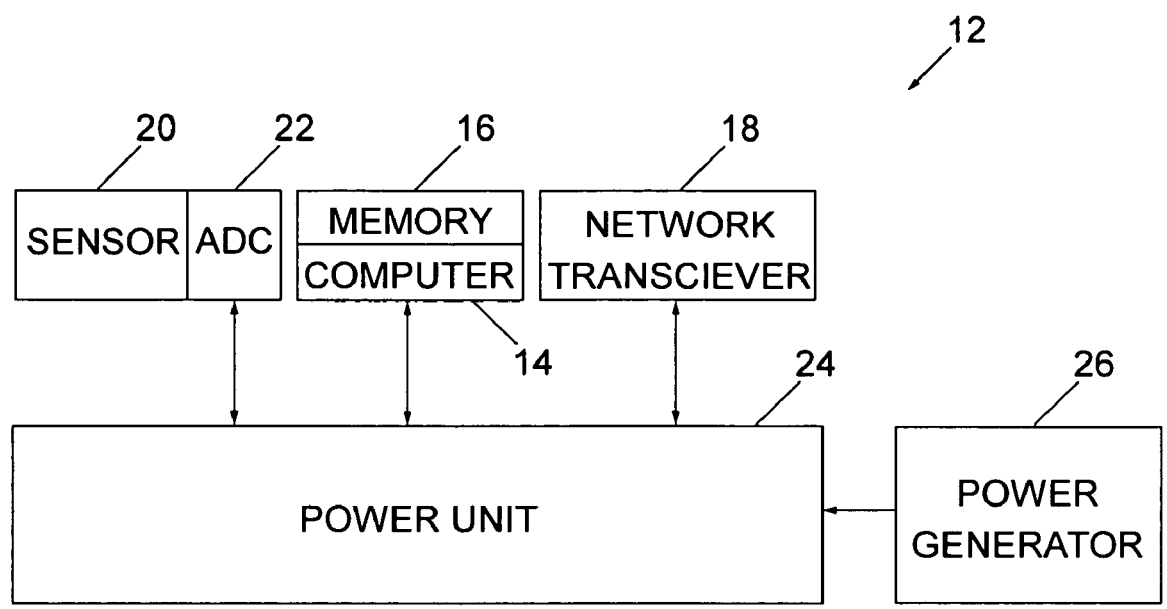
FIG. 2 illustrates a representative one of the nodes of the sensor network shown in FIG. 1.

As shown in FIG. 2, the node 12, which, for example, may be representative of each of the nodes shown in FIG. 1, includes a computer 14, a memory 16, and a network transceiver 18. Alternatively, the computer 14 may be a processor or a computer/data processor combination. Accordingly, the word computer is used generically herein.

Figure 4A:
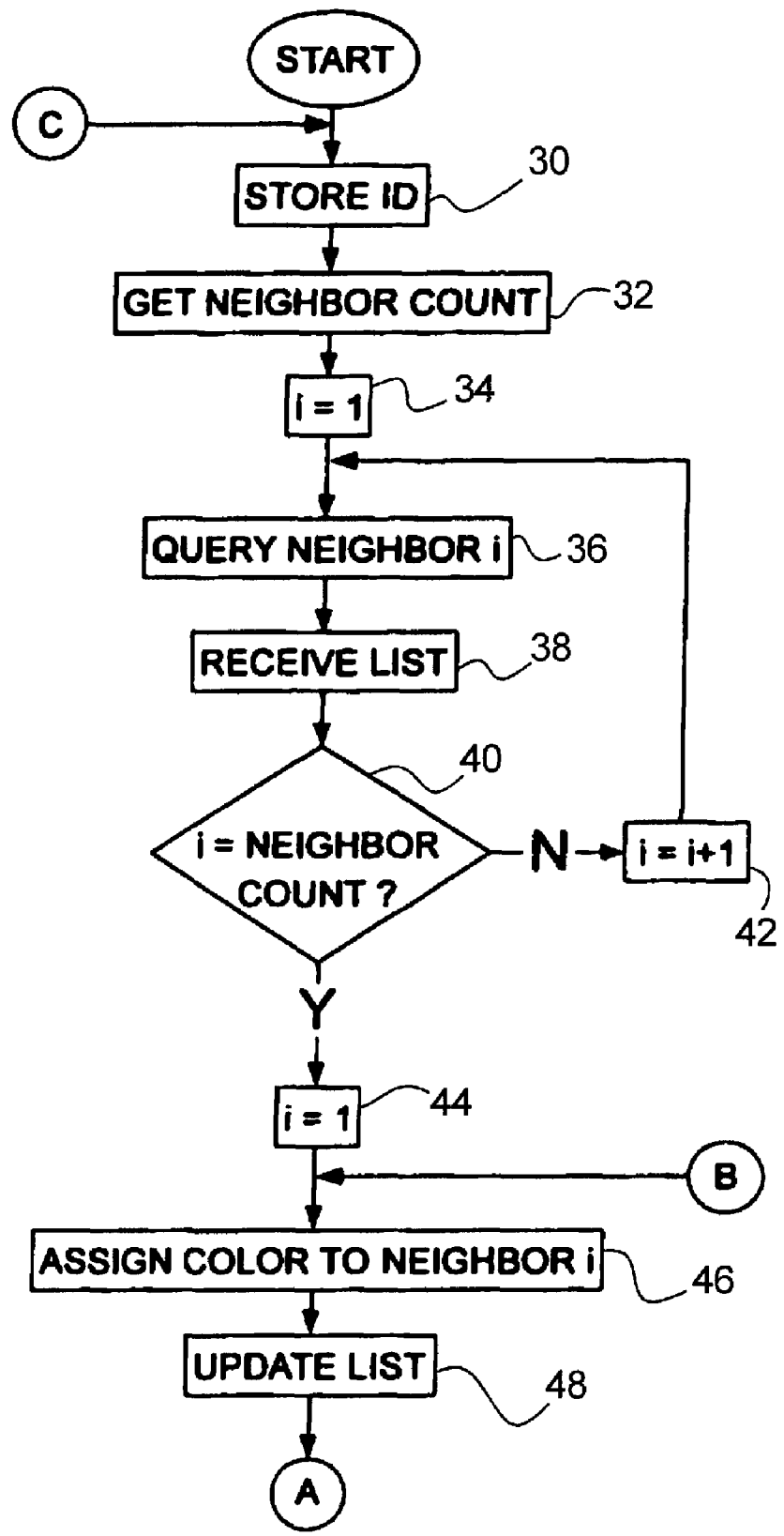
FIGS. 4A and 4B illustrate a flow chart of a program that may be executed by a mobile agent MA as it visits each of the nodes of FIG. 1; and, FIGS. 5A-5C illustrates an example of the operation of the mobile agent MA as it assigns time slots between nodes of an example network.
Figure 4B:
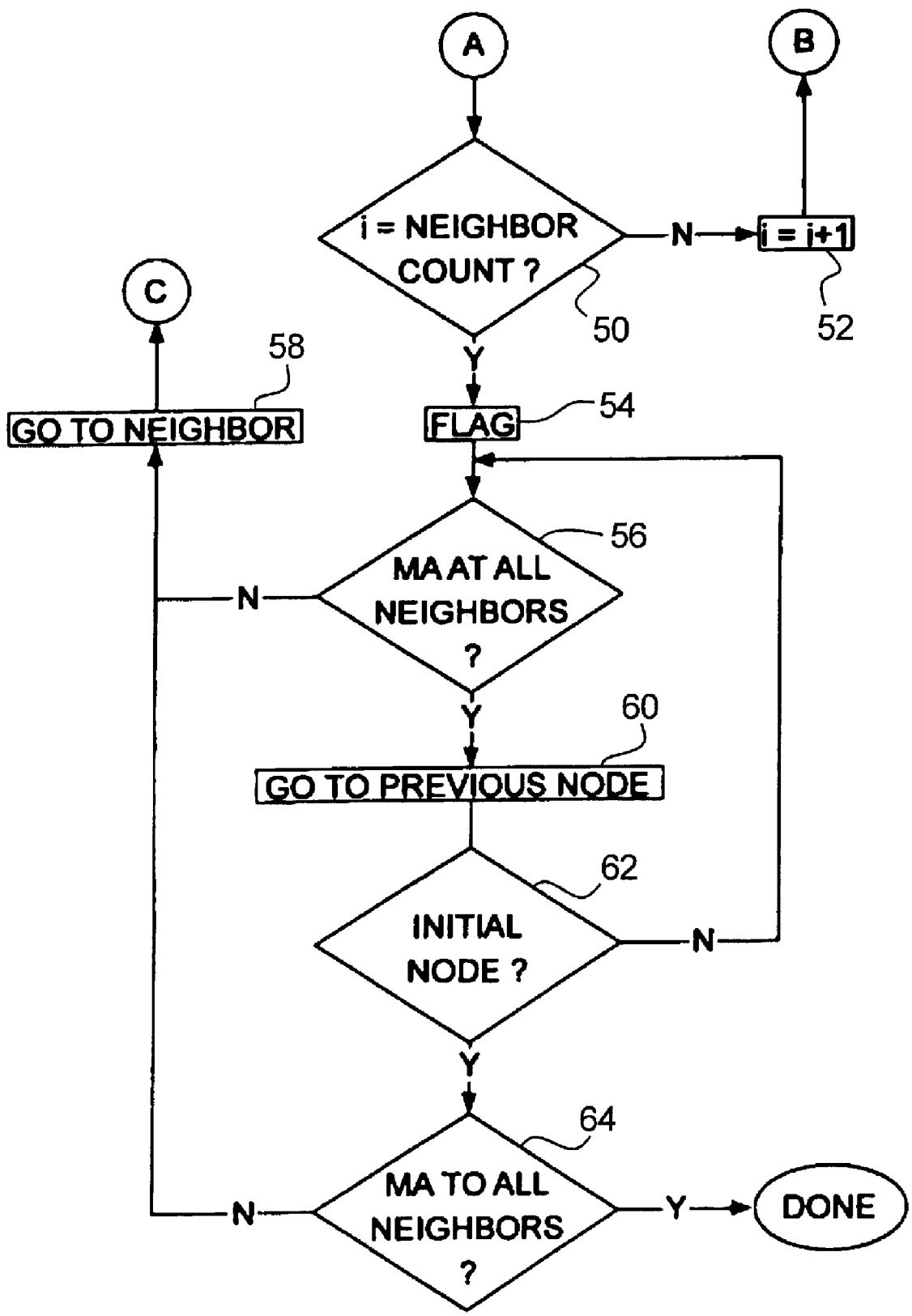

The memory 16 stores a program, such as the one shown in FIGS. 4A and 4B, whose execution by the computer 14 implements identity certification according to an embodiment of the present invention.

The network transceiver 18 permits communication between the node 12 and the other nodes in the network 10. The network transceiver 18 supports communication with other nodes of the network 10 such as the one hop neighbor nodes of the node 12. The communications transmitted or received by the network transceiver 18 can be wireless communications over wireless links as discussed above. Alternatively, the communications transmitted or received by the network transceiver 18 can be communications over physical or other links as also discussed above.

In the case where the node 12 is a sensor node, the node 12 also includes a sensor 20 and an A/D converter 22 that coverts the analog signal from the sensor 20 to a digital signal for processing by the computer 14. The sensor 20 can be any sort of sensor suitable for the particular application of the network 10. A power unit 24 is supplied with power from a power generator 26, and also provides power to and supports communication between the computer 14, the memory 16, the network transceiver 18, and the A/D converter 22. The power generator 26 can be a battery, a power supply, or any other type device capable of providing appropriate power for the node 12.

In the case where the network 10 is a wireless sensing network, the node 12 has a communication radius and a sensing radius. The communication radius defines a distance over which the node 12 is capable of effectively communicating with its one-hop neighbor nodes. The sensing radius defines a distance over which the sensor 20 of the node 12 is capable of effectively sensing a condition. The communication radius of the node 12 should be at least as great as the sensing radius of the sensor 20 of the node 12. Each of the other nodes of the network should be similarly constructed. Moreover, each node 12 of the network 10 should have at least one other node 12 within its communication radius. These relationships ensure that each of the nodes 12 of the network 10 will be able communicate any condition that it senses to at least one neighbor node in the network 10. If desired, the communication radius of the node 12 can be twice the sensing radius of the sensor 20 of the node 12.

In an embodiment of the present invention, slots are assigned to a node dependent upon the number of neighbor nodes it has. That is, a node is assigned one slot for each of its neighbor nodes. For example, the slot assigned to a node A for communications with a particular neighbor node B is exclusively used for the transfer of data by node A to node B, and this same slot cannot be used by node A for data transfer to other neighbors. Also, the same slot cannot be used by neighbors of node B for communications to node B. The concept of a mobile agent MA is introduced as one example of how this slot assignment algorithm can be implemented.

Any network can be viewed as a graph with vertices of the graph as nodes of the network. These vertices or nodes are colored by the mobile agent MA where coloring vertices of the graph is the same as assigning slots to nodes in the network.

The mobile agent MA is dispatched from a particular (initial) node and, as it moves from node to node, it assigns time slots to the neighbor nodes of each of the nodes that it visits. The mobile agent MA then returns to the initial node where the time slot assignment process started. This process may be referred to as coloring. Thus, when the mobile agent MA visits a node, it colors all of the neighbors of that node by assigning time slots to the neighbors.

This traversal of the mobile agent MA back to the initial node ensures that all the nodes in the network 10 are colored and completes the slot assignment process. During coloring, the mobile agent MA sits on an individual node, and chooses a unique time slot for each of its neighbor nodes. Each node gets its corresponding time slot and updates the value of the time slot in a time slot vs. node ID list that it maintains in its memory 16.

Figure 3:
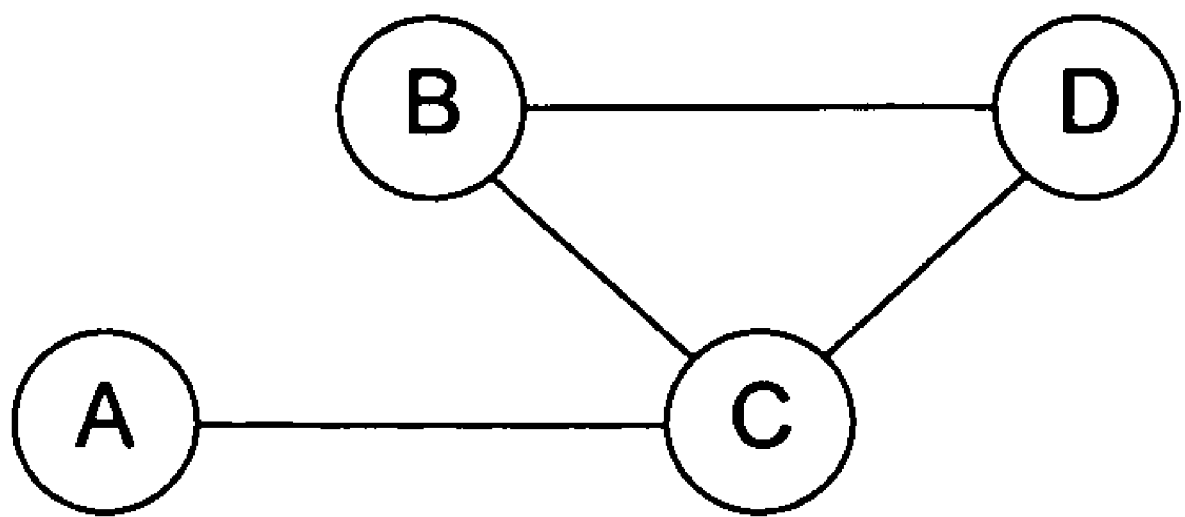
FIG. 3 illustrates a simplified network useful in explaining the assignment of time slots between nodes.

For example, FIG. 3 shows a simplistic network having nodes A, B, C, and D, where node A has only one neighbor node C (i.e., the node with which it is in one-hop communication), node B has only two neighbor nodes C and D, node C has only three neighbor nodes A, B, and D with which it is in one-hop communication, and node D has only two neighboring nodes B and C with which it is in one-hop communication. These nodes may be assigned time slots according to the Table I.

TABLE I

|   | A  | B  | C  | D  |
|---|----|----|----|----|
| A | NA | .  | 1  | .  |
| B | .  | NA | 2  | 1  |
| C | 1  | 2  | NA | 3  |
| D | .  | 1  | 3  | NA |

Thus, node A is in communication with only one node, node C, and, therefore, any communications between nodes A and C require only one time slot, time slot 1. Node C is in communication with three nodes, nodes A, B, and D, and, therefore, any communications between node C and nodes A, B, and D require three time slots, time slot 1 which has been established for node A and time slots 2 and 3 for nodes B and D, respectively. Node B is in communication with two nodes, nodes C and D, and, therefore, any communications between node B and nodes C and D require two time slots, time slot 2 which has been established for node C and time slot 1 which may be used because node D is not in direct communication with node A. Node D is in communication with two nodes, nodes B and C, and, therefore, any communications between node D and nodes B and C require two time slots, time slot 1 which has been established for node B and time slot 3 which has been established for node C.

Accordingly, if node D has information for node A, node D transmits that information to node C in time slot 3 and node C passes on that information to node A in time slot 1 in the next cycle.

The algorithm disclosed below is based on the following assumptions: Every node in the network 10 has an unique ID; the network 10 is a static system with homogenous nodes; the graph is fully connected; at no point of time is there more than one instance of the mobile agent MA in the network 10; the initial node (i.e., the node at which the mobile agent MA begins the coloring process) that creates the mobile agent MA and initiates the coloring process algorithm is determined in advance before the ad hoc deployment of the nodes in the network 10, and can be anywhere in the network 10; and, the nodes in the network 10 are locally synchronized. None of these assumptions are essential.

According to an embodiment of the present invention, a flow chart representing the basic coloring algorithm performed by the mobile agent is shown in FIGS. 4A and 4B.

The mobile agent MA starts or initiates operation of the coloring process at the Initial Node. The Initial Node generates the mobile agent MA to initiate the time slot assignment process. Many sensor network applications (such as target tracking) require random deployment of sensor nodes. So, the Initial Node could be anywhere in a random network with the result that the time slot assignment process can be started from anywhere. The node that the mobile agent MA is currently visiting may be referred to as the current node. Thus, while the mobile agent is at the Initial Node, the Initial Node is the current node. Upon initiation, the mobile agent stores the ID of the Initial Node.

At 30, the mobile agent MA stores the ID of the current node as the ID of the previously visited node. At 32, the mobile agent MA establishes a neighbor count that is a count of all the one-hop neighbors of the current node. The mobile agent MA may perform this function by instructing the current node to poll each of its one hop neighbors and by counting the replies. At 34, the mobile agent MA sets a variable i to 1, and at 36 the mobile agent MA instructs the current node to query its one hop neighbor$_i$ for its time slot list. Neighbor$_i$ sends its time slot list to the current node, and the mobile agent MA receives this time slot list at 38. Neighbor$_i$ also informs the current node whether the mobile agent MA has previously visited it, and the mobile agent MA also receives this information at 38.

At 40, the mobile agent MA determines whether the variable i is equal to the neighbor count. If not, the variable i is incremented by 1 at 42 and program flow returns to 36 where the mobile agent queries the next one-hop neighbor for its time slot list.

When the variable i is equal to the neighbor count, the mobile agent MA again sets a variable i to 1 at 44. At 46, the mobile agent MA checks the time slot list for neighbor$_i$ and assigns the smallest possible integer as the color (time slot) for the corresponding neighbor node. The smallest possible integer is the smallest integer that is not in the time slot list received from neighbor$_i$ and that is not assigned to other neighbor nodes by the current node. When a color has been assigned to neighbor$_i$, the mobile agent MA at 48 causes the time slot list of neighbor$_i$ to be updated by storing the assigned time slot in the time slot list in association with the ID of the current node. The mobile agent MA may cause this updated time slot list to be transmitted back to neighbor$_i$ or the mobile agent MA can carry this time slot list with it and leave it at neighbor$_i$ when the mobile agent MA visits neighbor$_i$.

At 50, the mobile agent MA determines whether the variable i is equal to the neighbor count. If not, the variable i is incremented by 1 at 52, and program flow returns to 46 where the mobile agent MA assigns a color to the next one-hop neighbor and update that neighbors time slot list.

When the variable i is equal to the neighbor count, the time slot lists of all neighbor nodes of the current node have been processed. The mobile agent at 54 sets a flag at the current node indicating that the current node has been visited, i.e., indicating that the mobile agent MA has finished all processing that is required at the current node. Each node uses this flag in sending the mobile agent MA at 38 an indication of whether it had been previously visited by the mobile agent MA.

The mobile agent MA at 56 uses the information about neighbor visits that it has gathered at 38 to determine whether it has visited all of the neighbors of the current node. If not, the mobile agent at 58 selects one of the unvisited neighbors of the current node to visit and moves to that node, which then becomes the current node. Program flow then returns to 30 where the mobile agent MA colors the one-hop neighbors of the now current node.

On the other hand, if the mobile agent MA at 56 determines that it has visited all of the neighbors of the current node, the mobile agent MA at 60 backtracks to a previous node whose ID it stored at 30. The mobile agent MA and/or the nodes of the network 10 have address spaces to store the ID of the previous node visited by the mobile agent MA. The ID of this previous node can be stored in a forward path in order to prevent the mobile agent MA from looping the same path. Thus, using this previous node ID information, the mobile agent MA backtracks at 60 to a previous node if all neighbor nodes of the current node have been visited by the mobile agent MA as determined at 56.

The mobile agent MA determines at 62 whether this previous node is the Initial Node. If this previous node is not the Initial Node, program flow returns to 56 to determine if the mobile agent has visited all neighbors of this previous node. However, if this previous node is the Initial Node, the mobile agent MA determines at 64 whether it has visited all neighbors of this Initial Node. If the mobile agent MA determines at 64 that it has visited all neighbors of this Initial Node, then processing is done. Otherwise, program flows returns to 58.

This process ensures that the mobile agent MA returns to the Initial Node and that all of the nodes in the network 10 are colored. Thus, coloring is ended when the mobile agent MA returns to the Initial Node and when all the neighbor nodes of the Initial Node are colored. If the degree of the Initial Node is k, the mobile agent MA backtracks less than or equal to k times to the Initial Node, depending upon network topology. The degree of the Initial Node is determined by the number of its one-hop neighbors. For example, if the Initial Node has two one-hop neighbors, the degree of the Initial Node is k=2.

The mobile agent MA can be defined as an entity having three attributes, identification, data space, and method. The identification attribute means that the mobile agent MA has a unique identity. This attribute is not essential when there is only one mobile agent MA in a network. The data space attribute means that the mobile agent MA has a data buffer which carries data structures. The method attribute means that the processing task or execution code is contained in the mobile agent MA.

Table II shows the programs and data structures carried by the mobile agent MA. The mobile agent MA carries the program code Assign_Color( ) in order to choose a unique slot/color for each neighbor node. The mobile agent MA carries the program code Select_Neighbor( ) in order to choose the next node to be visited. The mobile agent MA carries the program code Update_Node_ID( ) in order to update the ID of the node previously visited. The mobile agent MA carries the data structure Initial_Node_ID in order to carry with it identify the ID of the initial node. This data structure, therefore, ensures that the mobile agent MA will know when every node in the network 10 has been colored. The mobile agent MA carries the Previous-Node-ID in order to remember the ID of the previously visited node so that this ID can be stored in the next visited node.

TABLE II

| Method/Program | Data Structure |
| --- | --- |
| Assign_Color( ) | Previous-Node-ID |
| Select_Neighbor( ) | Initial-Node-ID |
| Update_Node_ID( ) | |

The mobile agent MA is generally a program that is transmitted from node to node in order to color the nodes of the network 10. An example of the mobile agent MA in terms of pseudocode immediately follows.

```
/Logic executed by the MA in a node/
Color( )
neighborcount = GetNeighborCount( )
for i = 1 to neighborcount do
    query(neighbor_i) /**query neighbor_i for time slot
        list**/
    receive (neighbor_i) /**receive time slot list from
        neighbor_i**/
end for
for i = 1 to neighborcount do
    Assign integer as color to neighbor_i where integer is
        the smallest integer that is not in the time
        slot list of neighbor_i and that is not assigned
        to other neighbors by the current node
end for
Backtrack( )
if MA has visited all neighbor nodes then
    go back to the previous node whose ID is stored in
        the current node
    if previous node is the Initial node and all
        neighbor nodes have been visited then
        Coloring of the entire network is completed
        End of the coloring process
    else
        Backtrack( )
    end if
else
    go to the unvisited neighbor node and color
    Backtrack( )
end if
```

Figure 5A:
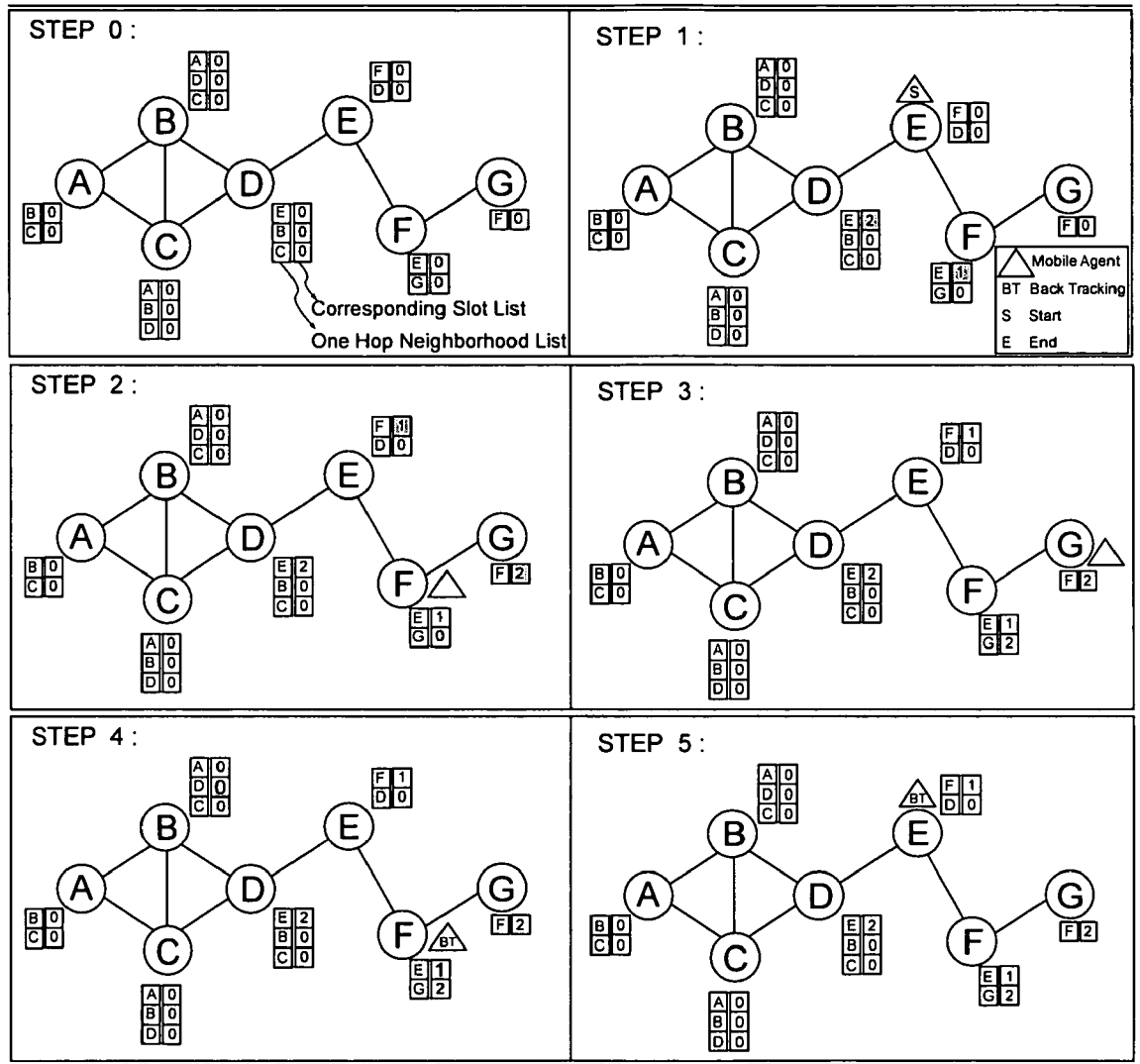
Figure 5B:
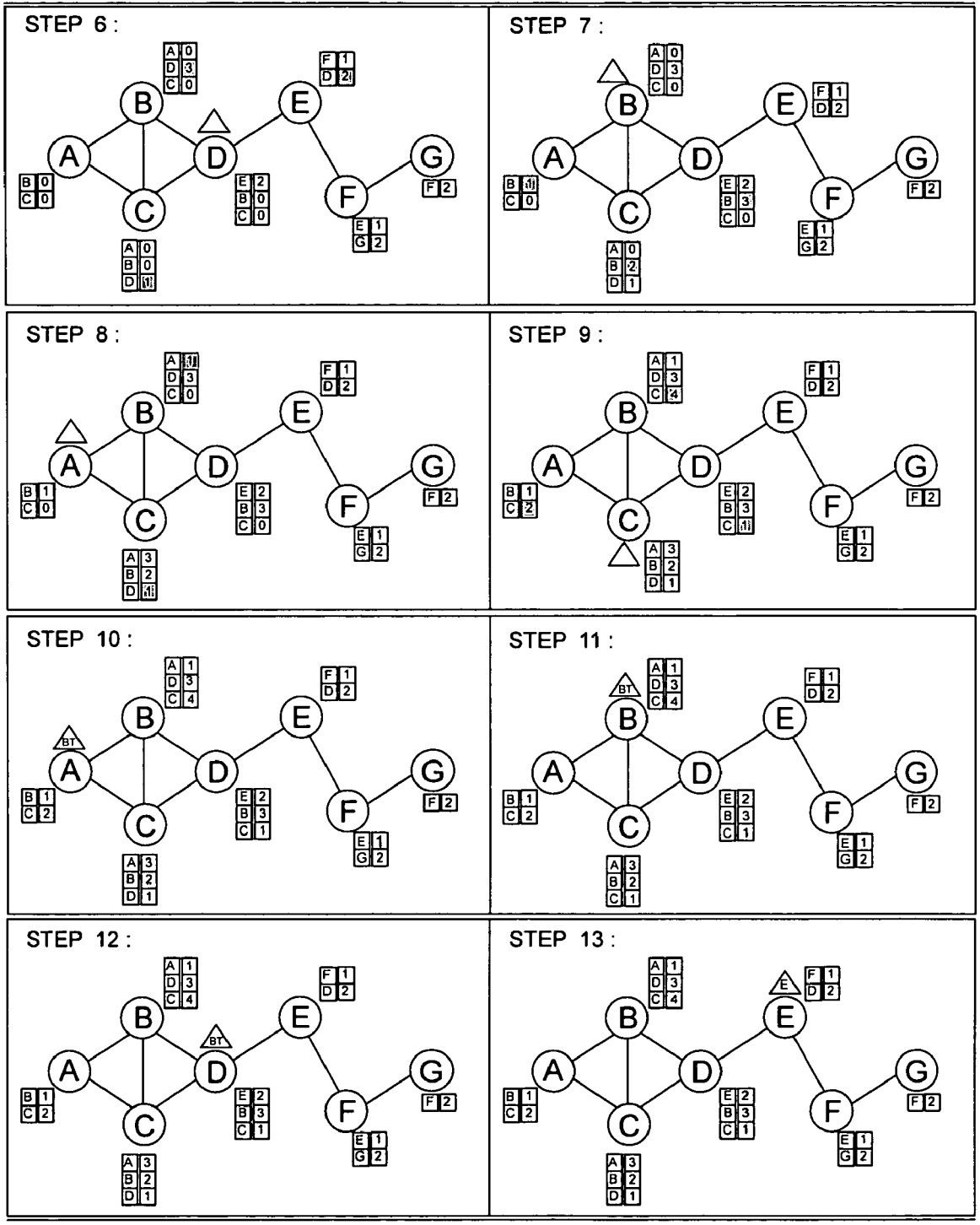
Figure 5C:
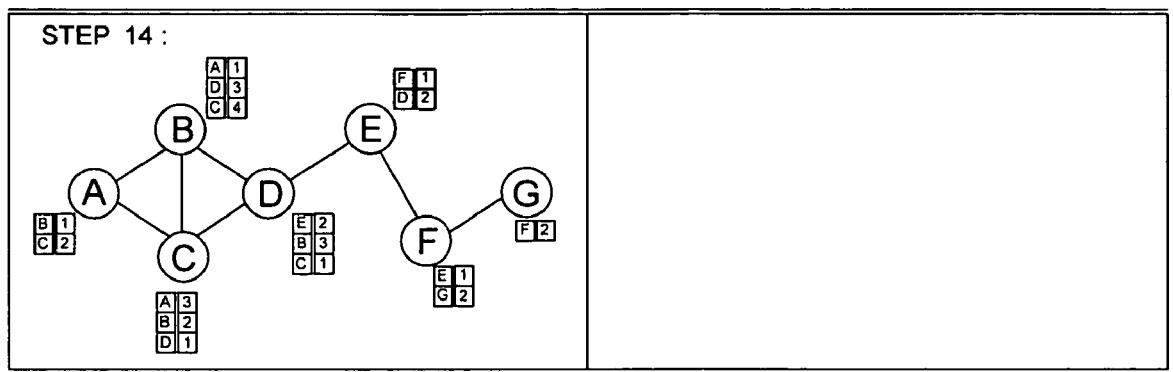

FIGS. 5A-5C illustrate the operation of the mobile agent MA as it assigns time slots between nodes of an example network. The network of FIGS. 5A-5C comprises nodes A, B, C, D, E, F, and G. Node A has two one-hop neighbor nodes B and C, node B has three one-hop neighbor nodes A, C, and D, node C has three one-hop neighbor nodes A, B, and D, node D has three one-hop neighbor nodes B, C, and E, node E has two one-hop neighbor nodes D and F, node F has two one-hop neighbor nodes E and G, and node G has a single one-hop neighbor node F.

Each node stores a time slot list as shown by step 14 in FIG. 5C. For example, the time slot list of node C contains the IDs of its one-hop neighbor nodes A, B, and D. The time slot list of node C also contains a time slot associated with the ID of each of its one-hop neighbor nodes A, B, and D. Thus, node C communications with node A in time slot 3, node C communications with node B in time slot 2, and node C communications with node D in time slot 1. Similarly, the time slot list of node B contains the IDs of its one-hop neighbor nodes A, C, and D. The time slot list of node B also contains a time slot associated with the ID of each of its one-hop neighbor nodes A, C, and D. Thus, node B communications with node A in time slot 1, node B communications with node C in time slot 4, and node B communications with node D in time slot 3.

It may be observed that both node pairs A/B and C/D use the same time slot 1. However, no collisions will result in time slot 1 because there is no common other node in the node pairs that use time slot 1.

It is assumed for purposes of this explanation that node E is the Initial Node. Thus, the mobile agent MA begins operation at node E. The mobile agent MA is depicted as a triangle in FIGS. 5A-5C. In step 0, the mobile agent MA has not begun its operation. In step 1, the mobile agent MA sits on node E and receives the time slot lists for each of its one-hop neighbor nodes D and F. The time slot lists of nodes D and F have no assigned time slots. Therefore, the mobile agent MA assigns a unique color to nodes D and F, i.e., the mobile agent MA at node E colors node F with time slot 1, the smallest possible integer not in the time slot list of node F and not previously assigned by node E, and colors node D with time slot 2, the next smallest possible integer not in the time slot list of node F and not previously assigned by node E. Accordingly, node E stores, in the time slot list of node F, the time slot 1 in association with the ID of node E, and node E stores, in the time slot list of node D, the time slot 2 in association with the ID of node E. Also, the mobile agent sets a flag indicating that the node E has been visited.

In step 2, the mobile agent MA moves to node F and receives the time slot lists for each of its one-hop neighbor nodes E and G. The time slot lists of nodes E and G have no assigned time slots. Therefore, the mobile agent MA colors node E with the time slot 1, the smallest possible integer not in the time slot list of node E and not previously assigned by node F. The mobile agent MA then colors node G with time slot 2, the next smallest possible integer not in the time slot list of node G and not previously assigned by node F Accordingly, node F stores, in the time slot list of node E, the time slot 1 in association with the ID of node F, and node F stores, in the time slot list of node G, the time slot 2 in association with the ID of node F. Also, the mobile agent sets a flag indicating that the node F has been visited.

In step 3, the mobile agent MA moves to node G and receives the time slot list for its one-hop neighbor node F. The time slot list of node F has one assigned time slot. Therefore, the mobile agent MA colors node F with the time slot 2, the smallest possible integer not in the time slot list of node F and not previously assigned by node G. Accordingly, node G stores, in the time slot list of node F, the time slot 2 in association with the ID of node G. Also, the mobile agent sets a flag indicating that the node G has been visited.

In step 4, because the mobile agent MA has visited all neighbors of the node G, the mobile agent MA returns to the previous node, i.e., node F.

In step 5, because the mobile agent MA has visited all neighbors of the node F, the mobile agent MA returns to the previous node, i.e., node E.

In step 6, because the mobile agent MA has not visited all neighbors of the node E, the mobile agent MA moves to an unvisited neighbor node, i.e., node D, and receives the time slot lists for its one-hop neighbor nodes B, C, and E. The time slot lists of nodes B and C have no assigned time slots, and the time slot list of node E has one assigned time slot. Therefore, the mobile agent MA colors node C with the time slot 1, the smallest possible integer not in the time slot list of node C and not previously assigned by node D. Accordingly, node D stores, in the time slot list of node C, the time slot 1 in association with the ID of node D. The mobile agent MA then colors node E with time slot 2, the next smallest possible integer not in the time slot list of node E and not previously assigned by node D. Accordingly, node D stores, in the time slot list of node E, the time slot 2 in association with the ID of node D. The mobile agent MA then colors node B with time slot 3, the next smallest possible integer not in the time slot list of node B and not previously assigned by node D. Accordingly, node D stores, in the time slot list of node B, the time slot 3 in association with the ID of node D. Also, the mobile agent sets a flag indicating that the node D has been visited.

In step 7, the mobile agent MA moves to node B and receives the time slot lists for each of its one-hop neighbor nodes A, C, and D. The time slot list of node A has no assigned time slots, and each of the time slot lists of nodes C and D has one assigned time slot. Therefore, the mobile agent MA colors node A with the time slot 1, the smallest possible integer not in the time slot list of node A and not previously assigned by node B. Accordingly, node B stores, in the time slot list of node A, the time slot 1 in association with the ID of node B. The mobile agent MA then colors node C with time slot 2, the next smallest possible integer not in the time slot list of node C and not previously assigned by node B. Accordingly, node B stores, in the time slot list of node C, the time slot 2 in association with the ID of node B. The mobile agent MA then colors node D with time slot 3, the next smallest possible integer not in the time slot list of node D and not previously assigned by node B. Accordingly, node B. stores, in the time slot list of node D, the time slot 3 in association with the ID of node B. Even though the time slot 1 appears in the time slot list of node C, the mobile agent MA can assign time slot 1 for communications to node B because node C does not use time slot 1 for communications with node B. Therefore, no collisions can occur in time slot 1 as used by node A. Accordingly, node B stores, in the time slot list of node A, the time slot 1 in association with the ID of node B, node B stores, in the time slot list of node C, the time slot 2 in association with the ID of node B, and node B stores, in the time slot list of node D, the time slot 3 in association with the ID of node B. Also, the mobile agent sets a flag indicating that the node B has been visited. In step 8, the mobile agent MA moves to node A and receives the time slot lists for each of its one-hop neighbor nodes B and C. The time slot lists of nodes A and B have assigned time slots. Therefore, the mobile agent MA colors node B with the time slot 1, the smallest possible integer not in the time slot list of node B and not previously assigned by node A. Accordingly, node A stores, in the time slot list of node B, the time slot 1 in association with the ID of node A. The mobile agent MA colors node C with the time slot 3, the next smallest possible integer not in the time slot list of node C and not previously assigned by node A. Accordingly, node A stores, in the time slot list of node C, the time slot 3 in association with the ID of node A. Also, the mobile agent sets a flag indicating that the node A has been visited.

In step 9, the mobile agent MA moves to node C and receives the time slot lists for each of its one-hop neighbor nodes A, B, and D. The time slot lists of nodes A, B, and D have assigned time slots. Therefore, the mobile agent MA colors node A with the time slot 2, the smallest possible integer not in the time slot list of node A and not previously assigned by node C. Accordingly, node C stores, in the time slot list of node A, the time slot 2 in association with the ID of node C. The mobile agent MA colors node B with the time slot 4, the next smallest possible integer not in the time slot list of node B and not previously assigned by node C. Accordingly, node C stores, in the time slot list of node B, the time slot 4 in association with the ID of node C. The mobile agent MA colors node D with the time slot 1, the smallest possible integer not in the time slot list of node D and not previously assigned by node C. Accordingly, node C stores, in the time slot list of node D, the time slot 1 in association with the ID of node C. Also, the mobile agent MA sets a flag indicating that the node C has been visited.

In step 10, because the mobile agent MA has visited all neighbors of the node C, the mobile agent MA returns to the previous node, i.e., node A.

In step 11, because the mobile agent MA has visited all neighbors of the node A, the mobile agent MA returns to the previous node, i.e., node B.

In step 12, because the mobile agent MA has visited all neighbors of the node B, the mobile agent MA returns to the previous node, i.e., node D.

In step 13, because the mobile agent MA has visited all neighbors of the node D, the mobile agent MA returns to the previous node, i.e., node E.

In step 14, the mobile agent MA determines that it had previously visited node E, that node E is the Initial Node, and also that all neighbors of node E have been visited. The mobile agent MA, thus, determines that coloring is done.

Certain modifications of the present invention have been discussed above. Other modifications of the present invention will occur to those practicing in the art of the present invention. For example, FIG. 2 shows a node construction that can be used for each of the nodes in the network 10. However, the nodes of the network 10 may be differently constructed. Indeed, as discussed above, the nodes of the network 10 can be supplied by different vendors, but such different nodes can still be programmed to operate as claimed herein.

In addition, the present invention has been described with particular reference to sensor networks. However, the present invention has applicability with other networks as well.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:
1. A wireless network comprising:
   a plurality of wireless sensor nodes, wherein each node has a communication radius and a sensing radius, wherein the communication radius defines a distance over which a corresponding node is capable of effectively communicating, wherein the sensing radius defines a distance over which a corresponding node is capable of effec- tively sensing a condition, and wherein the communication radius of each node should be at least as great as the sensing radius of the corresponding node; and, an executable mobile agent that moves to a current node in the network, that executes so as to access neighbor information including time slot information relative to one-hop neighbor nodes of the current node, and that executes so as to assign mutually exclusive time slots to only the one-hop neighbor nodes.

2. The wireless network of claim 1 wherein the communication radius of each node should be about twice as great as the sensing radius of the corresponding node.

3. The wireless network of claim 1 wherein the mobile agent sets a flag at the current node indicating that the mobile agent has visited the current node.

4. The wireless network of claim 1 wherein the mobile agent communicates the time slot assignments to the neighbor nodes.

5. The wireless network of claim 1 wherein the current node comprises an old current node, wherein the neighbor nodes comprise old neighbor nodes, wherein the neighbor information comprise old neighbor information, and wherein the mobile agent comprises a mobile agent that moves from the old current node to one of the old neighbor nodes such that the one old neighbor node becomes a new current node, that accesses new neighbor information including time slot information relative to new one-hop neighbor nodes of the new current node, and that assigns mutually exclusive time slots to only the new neighbor nodes.

6. The wireless network of claim 5 wherein the mobile agent comprises a mobile agent that determines at the old current node that at least one of the old neighbor nodes has not been visited by the mobile agent, and that moves from the old current node to the one old neighbor node that has not been visited by the mobile agent, wherein the one old neighbor node comprises the new current node.

7. The wireless network of claim 1 wherein the mobile agent comprises a mobile agent that determines whether at least one of the neighbor nodes has been visited by the mobile agent, that backtracks, if all of the neighbor nodes have been visited by the mobile agent, to a previously visited neighbor node, that moves, if at least one of the neighbor nodes has not been visited by the mobile agent, from the current node to the at least one neighbor node that has not been visited by the mobile agent, and that executes at the at least one neighbor node that has not been visited by the mobile agent.

8. The wireless network of claim 7 wherein the mobile agent comprises a mobile agent that ends movement if all of the neighbor nodes of the current node have been visited by the mobile agent and if the current node is a node where the mobile agent began operation.

9. The wireless network of claim 1 wherein the mobile agent comprises a mobile agent that assigns a smallest possible integer as the time slot to each of the neighbor nodes, and wherein the smallest possible integer comprises an integer that is not in the neighbor information of the neighbor nodes and that has not been previously assigned by the current node.

10. The wireless network of claim 1 wherein each node of the network is located within the communication radius of at least one other node.

* * * * *